(12) United States Patent
Roberts et al.

(10) Patent No.: US 8,991,501 B2
(45) Date of Patent: Mar. 31, 2015

(54) SEPARATION DEVICE

(75) Inventors: Paul Roberts, Backwell (GB); Thomas Dunkerton, Southville (GB)

(73) Assignee: Viper Subsea Technology Limited, Bristol (GB)

( * ) Notice: Subject to any disclaimer, the term of this patent is extended or adjusted under 35 U.S.C. 154(b) by 110 days.

(21) Appl. No.: 13/346,898

(22) Filed: Jan. 10, 2012

(65) Prior Publication Data

US 2012/0175123 A1    Jul. 12, 2012

(30) Foreign Application Priority Data

Jan. 11, 2011    (GB) .................................. 1100414.0

(51) Int. Cl.
| | | |
|---|---|---|
| *E21B 19/14* | (2006.01) | |
| *E21B 33/035* | (2006.01) | |
| *E21B 33/038* | (2006.01) | |
| *E21B 41/00* | (2006.01) | |
| *E21B 41/04* | (2006.01) | |
| *H02G 9/02* | (2006.01) | |

(52) U.S. Cl.
CPC ........... *E21B 33/0355* (2013.01); *E21B 33/038* (2013.01); *E21B 41/0007* (2013.01); *E21B 41/04* (2013.01); *H02G 9/02* (2013.01)
USPC ........... 166/341; 166/344; 166/363; 166/339; 166/381

(58) Field of Classification Search
USPC ......... 166/344, 368, 363, 364, 373, 339, 341, 166/381; 137/236.1, 260, 825, 635, 554, 137/557
See application file for complete search history.

(56) References Cited

U.S. PATENT DOCUMENTS

| | | | |
|---|---|---|---|
| 5,273,376 A | 12/1993 | Ritter | |
| 8,387,702 B2 * | 3/2013 | Biester | 166/338 |
| 2002/0109352 A1 | 8/2002 | Smith et al. | |
| 2004/0127084 A1 * | 7/2004 | Glennie et al. | 439/316 |
| 2006/0249290 A1 * | 11/2006 | Bartlett | 166/338 |
| 2008/0143100 A1 * | 6/2008 | Webster | 285/18 |
| 2009/0038805 A1 | 2/2009 | Parks et al. | |
| 2010/0186964 A1 * | 7/2010 | Reid et al. | 166/341 |
| 2011/0088909 A1 * | 4/2011 | Hamblin et al. | 166/340 |
| 2012/0168168 A1 * | 7/2012 | Cruden | 166/338 |

FOREIGN PATENT DOCUMENTS

GB    2467192    7/2010

OTHER PUBLICATIONS

Search Report for GB12250005.1 dated Apr. 1, 2014.
Search Report for GB1100414.0 dated Mar. 11, 2011.

* cited by examiner

*Primary Examiner* — James G Sayre
(74) *Attorney, Agent, or Firm* — Andrus Intellectual Property Law, LLC

(57) ABSTRACT

A subsea separation device for use in separating a pair of stabplate connector plates, the subsea separation device comprising a first engagement member adapted to engage, in use, a first one of the connector plates, or a component rigidly secured thereto, a second engagement member adapted to engage, in use, a second one of the connector plates or a component rigidly secured thereto, and drive means operable to urge the first and second engagement members apart and so urge the connector plates apart.

15 Claims, 5 Drawing Sheets

SEPARATION DEVICE

BACKGROUND OF THE INVENTION

This invention relates to a separation device and in particular to a separation device suitable for use in subsea locations to permit the separation of stabplates once the retainer or retaining mechanism used to secure the stabplates to one another, in use. has been disengaged.

The use of equipment located at the sea bed is commonplace in the extraction of oil and gas from subsea wells, for example to control the pumping of hydrocarbon materials therefrom. Although the majority of the description herein relates to use in relation to the extraction of hydrocarbon materials, it will be appreciated that the invention is not restricted in this regard, and may be used in, for example, off-shore electrical generation and other subsea applications. Typically, a number of individual pieces of equipment are connected to a distribution unit via a series of flying leads. The distribution unit is connected to remotely located equipment, for example at the sea surface or on land, or at another suitable location, by an umbilical. The flying leads and umbilical are each, typically, of relatively complex form, for example comprising a number of electrical cables for the transmission of electrical power and/or control signals, fibre optical cables, hydraulic power/control lines and/or lines carrying chemicals for supply to the seabed located equipment. At each end of each flying lead and at the end of the umbilical there may be a connector, known as a stabplate, adapted to mate with a corresponding connector or stabplate provided on the equipment to which that lead is to be connected. As each lead is of complex form, it will be appreciated that the connectors are also of complex form so as to permit a plurality of lines of the lead, for example the electrical, hydraulic, fibre optic and/or chemical lines as mentioned hereinbefore, to be connected simultaneously to the corresponding parts of the connector of the equipment. The connectors used in such locations may be of the general type described and illustrated in copending British patent application publication number GB2467192 and corresponding applications filed overseas. A stabplate connector of this form includes a connector plate having a series of individual connectors provided thereon, each of which is adapted to connect to a corresponding connector of a second connector plate secured to the subsea equipment. A securing mechanism is provided to secure the connector plates to one another. As described in GB2467192, the securing mechanism may comprise an angularly movable shaft associated with one of the connector plates and having a non-circular end part adapted to be introduced into a similarly shaped socket of the other of the connector plates. In use, upon connection of the connector plates to one another, the end part of the shaft is introduced into the socket. It is then rotated through a suitable angle as to prevent retraction of the end part back out of the socket. The shaft is then placed under tension to securely clamp the connector plates to one another.

If there is a need to separate the connector plates, for example for maintenance to be undertaken, then the tensile load is removed from the shaft and the shaft returned to its original angular position so as to allow the connector plates to be separated. Separation of the connector plates, like connection thereof, is typically undertaken using an ROV, although in some circumstances a diver may undertake this work.

As the stabplates are generally installed and left in position for extended periods of time, marine deposits such as calcareous deposits, coral growth, etc, may result in the connector plates being retained to one another despite the release of the securing mechanism.

Furthermore, where chemical lines or hydraulic lines are provided, the valves incorporated into the connectors thereof may result in separation of the connector plates drawing a vacuum, and so a relatively large separating load may be required to force the connector plates apart against the drawing of such a vacuum.

To counter this and allow separation of the connector plates, release of the securing mechanism may also be adapted to apply a separating load to the connector plates to force them apart.

There may be circumstances in which the separating load applied by such a securing mechanism is insufficient or cannot be used to achieve separation. For example, the separating load may be insufficient to break apart the marine deposits. Furthermore, there may be circumstances in which a secondary release mechanism has had to be deployed to release the securing means, and such a mechanism may not incorporate means to apply a separating load. For example, some secondary release techniques involve decoupling the securing mechanism by shearing or the like, in which case it will not be possible to apply a separating load by way of the securing mechanism. Where separation of the connector plates is not possible in a simple and convenient manner, then the coupled connector, and associated pieces of equipment, may have to be moved to the surface for repair, which is a costly and time consuming operation.

SUMMARY OF THE INVENTION

It is an object of the invention to provide a separating device suitable for use in such circumstances to assist in separation of the connector plates.

According to the invention there is provided a subsea separation device for use in separating a pair of stabplate connector plates, the subsea separation device comprising a first engagement member adapted to engage, in use, a first one of the connector plates, or a component rigidly secured thereto, a second engagement member adapted to engage, in use, a second one of the connector plates or a component rigidly secured thereto, and drive means operable to urge the first and second engagement members apart and so urge the connector plates apart.

The drive means may comprise, for example, at least one hydraulic ram, in practise several such rams conveniently being used, operable to urge apart the engagement members. Alternatively, an electrically powered motor may be used, for example to drive a screw actuator. Furthermore, an electro-hydraulic hybrid may be used in which control is achieved, for example, electrically, whilst the motive power used to urge the engagement members apart may be derived hydraulically. In each case, the drive means may be operated using an internal power supply, or alternatively may be powered using an external power supply such as a surface located power supply or, where the device is to be operated using an ROV, an ROV located power source. In another possible arrangement, the drive means may be a mechanical drive means arranged to be driven by a mechanical input from, for example, a part of an ROV. Thus, a lever pushed by part of the ROV could be used to operate the drive means.

Conveniently, the separation device is adapted to be secured in position, temporarily, when required.

Where the stabplate connector with which the device is to be used incorporates a secondary release mechanism, then the device may optionally further incorporate actuator means operable to actuate the secondary release feature.

BRIEF DESCRIPTION OF THE DRAWINGS

The invention will further be described, by way of example, with reference to the accompanying drawings, in which.

DESCRIPTION OF THE PREFERRED EMBODIMENTS

Figure 1:
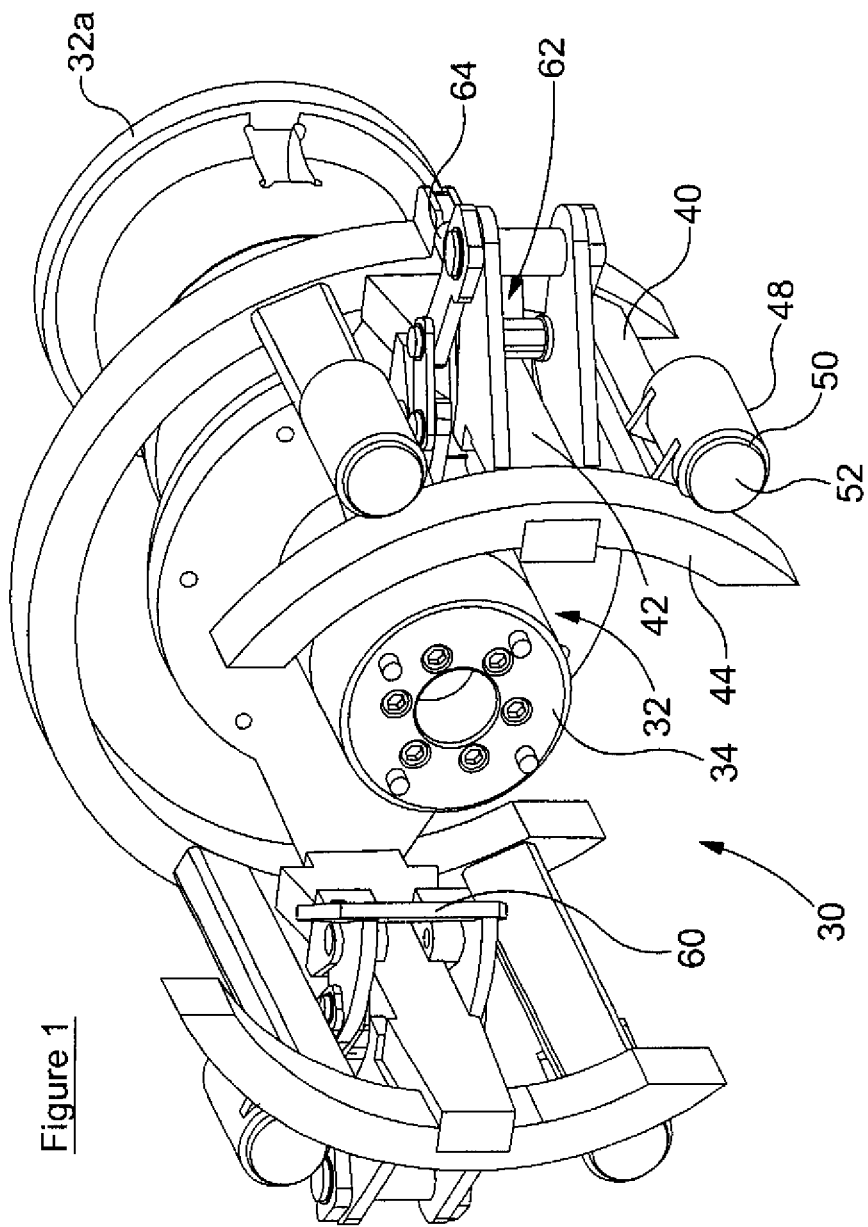
FIG. 1 is a perspective view illustrating a separation device in accordance with one embodiment of the invention.
Figure 2:
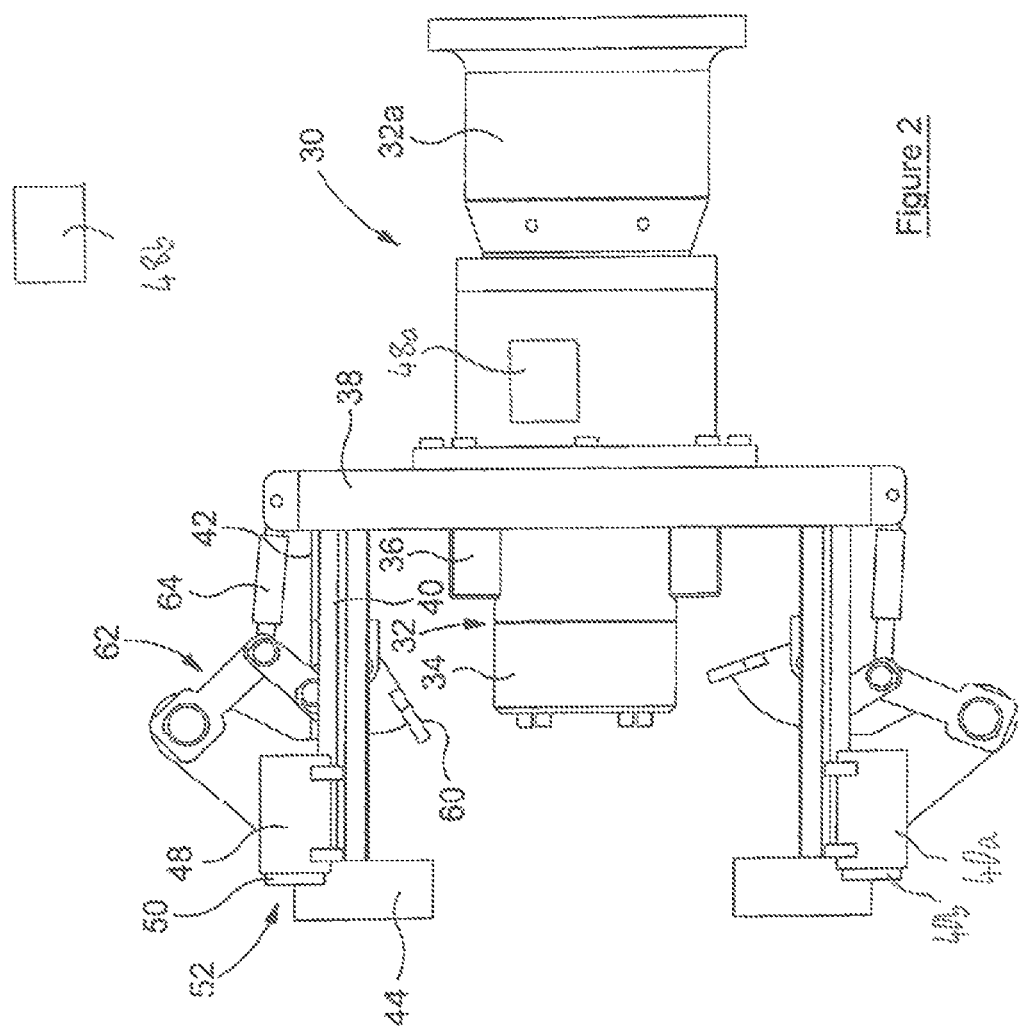
FIG. 2 is a top plan view illustrating the separation device of FIG. 1.
Figure 3:
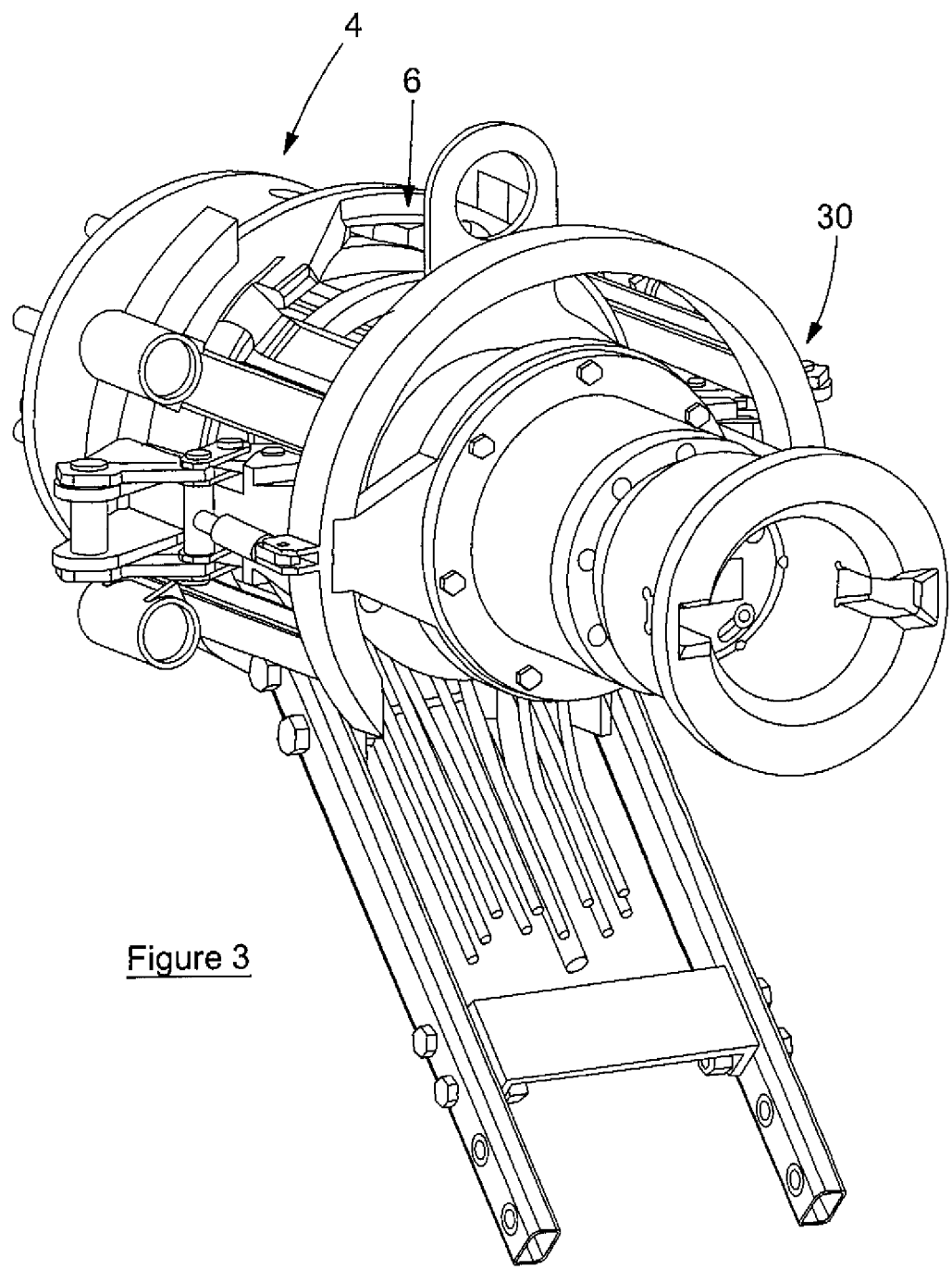
FIGS. 3 and 4 are views illustrating the separation device mounted in an in-use position secured to a stabplate connector.
Figure 4:
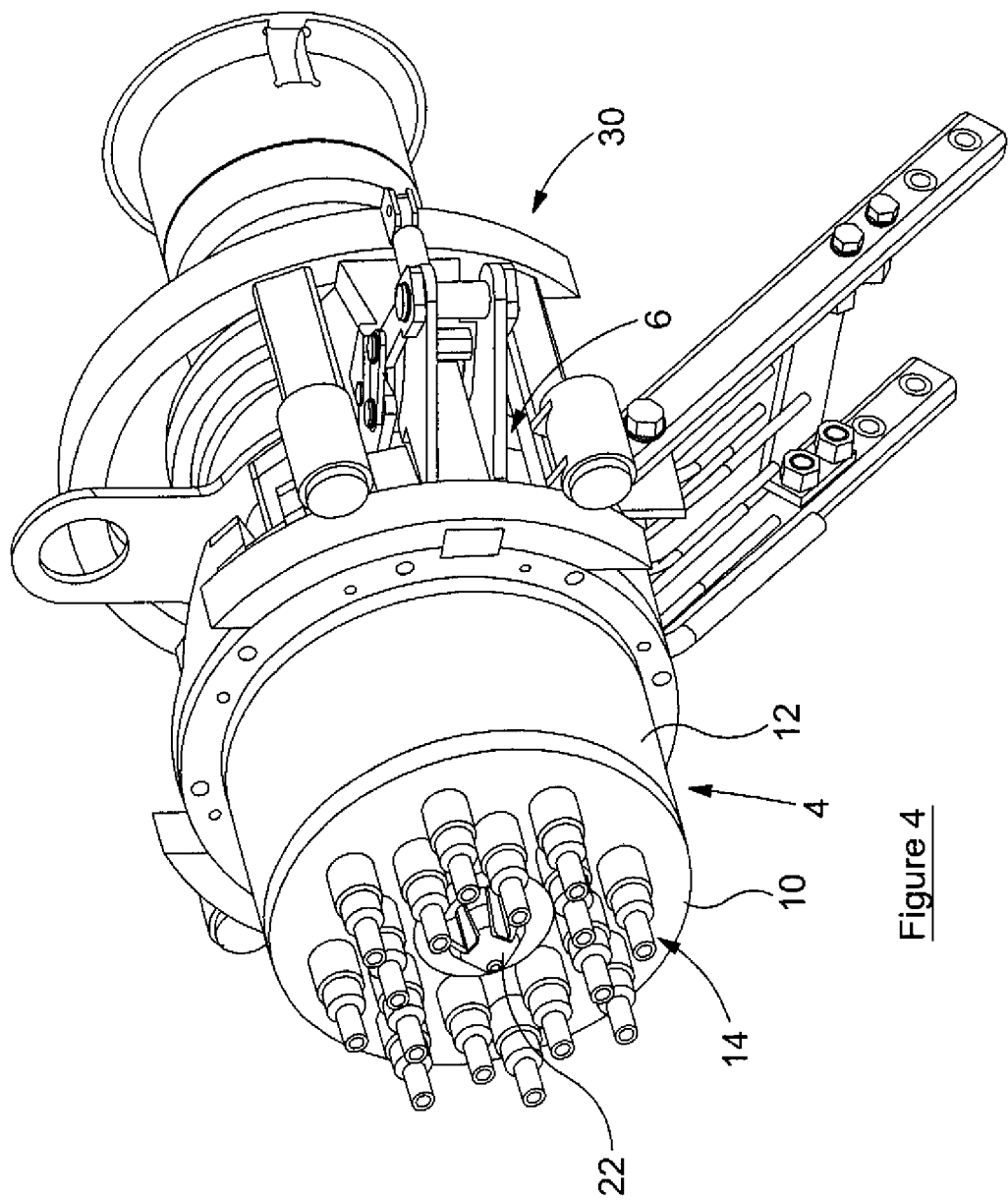
Figure 5:
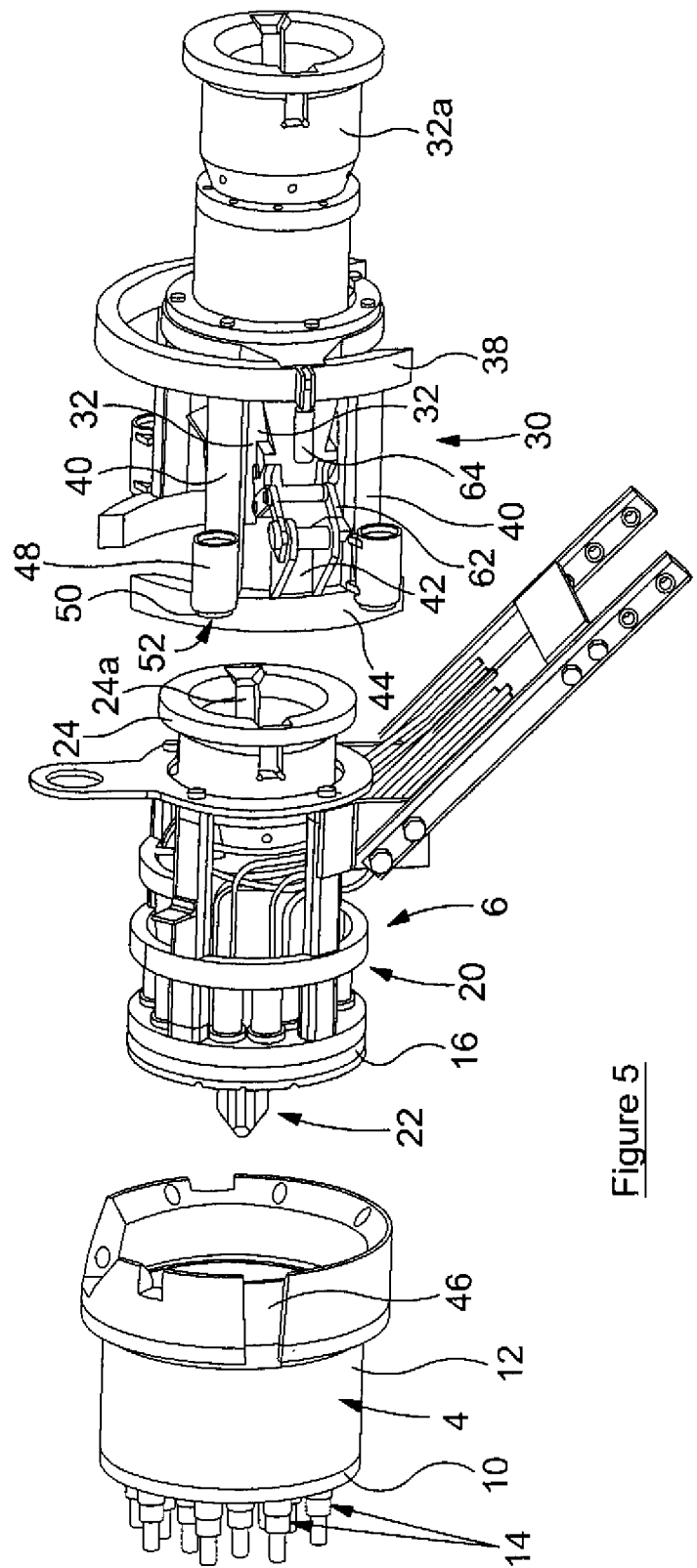
FIG. 5 is an exploded view illustrating the device and the two stabplate halves with which it is used.

Referring to the accompanying drawings, a stabplate of the general form described and illustrated in greater detail in GB2467192 is shown. The stabplate comprises a first, fixed stabplate part 4 to which a second, flying stabplate part 6 can be secured. The first stabplate part 4 comprises a fixed connector plate 10 secured to a tubular socket housing 12 which in turn is secured, in use, to a housing (not shown) of a piece of subsea equipment. The connector plate 10 includes a series of individual connectors 14 which are connected, via associated lines, to parts of the equipment to supply power thereto and/or carry control signals between parts of the equipment and a remote location. Some of the connectors 14 may take the form of electrical connectors. Others may provide hydraulic connections or permit the supply of chemicals to the equipment. These connectors are conveniently provided with poppet valves or the like to prevent or restrict the escape of fluid or ingress of sea water when the stabplate is disconnected.

The connector plate 10 includes a central opening of generally cruciform shape.

The second stabplate part 6 comprises a second, flying connector plate 16 provided with a similar series of individual connectors adapted to cooperate with corresponding ones of the connectors 14 to provide connections between the internal lines of the equipment and corresponding lines of a flying lead. The connector plate 16 is secured to a support frame 20, and the support frame 20, in turn, carries a securing shaft 22, an end part of which is of generally cruciform shape. The end part of the securing shaft 22 projects from the connector plate 16 and is shaped so as to be able to pass through the opening of the connector plate 10 in one angular orientation, rotation of the shaft 22 to another angular orientation preventing the shaft from passing through the opening of the connector plate 10. Once introduced through the opening and rotated, the shaft 22 can also be placed under tension so as to clamp the plates 10, 16 to one another.

The support frame 20 further includes a connector and drive input 24 whereby the support frame 20 can be affixed to an arm of an ROV to permit manipulation thereby, and whereby a load can be applied to drive the shaft 22 for movement thereof.

GB 2467192 provides further details regarding the nature of the stabplate connector and reference should be made thereto for further information regarding the structure and operation thereof.

The subsea separation device 30 of this embodiment of the invention comprises a connector 32 adapted to permit coupling to the connector and drive input 24 of the second stabplate part 6 to rigidly secure the separation device 30 thereto. As illustrated, the connector 32 includes a central hub 34 adapted to be received into a recess of the connector and drive input 24, the hub 34 having retractable projections 36 associated therewith which, when retracted, allow the hub 34 to be introduced into the recess and which, when deployed, extend through openings 24a provided in the connector and drive input 24, securing the connector 32 thereto in such a manner as to permit torque transmission therebetween. The projections 36 are conveniently hydraulically driven between their retracted and deployed, extended positions. However, it will be appreciated that this need not always be the case and that other arrangements are possible. For example, they may be electrically driven or may be moved mechanically by appropriate operation of an ROV or the like, for example using a screw type coupling.

Secured to the connector 32 is a part-circular support 38 from which a plurality of arms 40 and a pair of guides 42 extend. The manner in which the connector 32 and support 38 are connected is such as to allow the connector 32 to move angularly relative to the support 38, but to substantially prevent relative axial movement therebetween. The diameter of the support 38 is sufficient to ensure that the arms 40 and guides 42 do not foul against parts of the second stabplate plate 6 as the separation device 30 is being moved into position. The arms 40 are of a sufficient length that, as the connector 32 is fitted and secured into position with respect to the connector and drive input 24 of the second stabplate part 6, the free ends of the arms 40, and arcuate interconnecting members 44 attached thereto, move into engagement with the housing of the equipment to which the associated first stabplate part 4 is secured. The guides 42 project slightly radially inwardly of the arcuate interconnecting members 44 and the end parts thereof are shaped to be received within corresponding recesses 46 provided within a guide tube 48 forming part of the first stabplate part 4. It will be appreciated that once received within the recesses 46, the guides 42 serve to resist or limit angular movement of the separation device 30 relative to the first stabplate part 4.

Pivotally connected to the guides 42 are engagement members in the form of latching arms 60 which are coupled through respective drive linkage arrangements 62 with associated drive pistons 64 connected to the support 38 and operable to drive the linkage arrangements 62 and latching arms 60 between retracted and engaged positions. in the retracted positions, the latching arms 60 are orientated such as to permit the device 30 to be introduced onto and around the second stabplate 6 without fouling, as mentioned hereinbefore. Once so positioned, operation of the pistons 64 drives the latching arms 60 to their engaged positions in which they cooperate with parts of the second stabplate 6, for example parts of the housing or support frame 20 thereof, in such a manner as to secure the device 30 to the second stabplate 6 such that axially directed forces can be transmitted from the device 30 through the latching arms 60 to the second stabplate 6.

The connector 32 is connected to an input connector 32a adapted to permit connection to, for example, an ROV. The connector 32 and input connector 32a are interconnected in such a manner that relative axial movement is not permitted therebetween, although relative angular movement therebetween may take place.

The outer surfaces of the arms 40 carry respective hydraulic rams, each of which comprises a housing 48 secured to the associated arm 40, and a moveable piston 50 having an engagement end surface 52 projecting from the housing 48 and arranged to engage, in use, an adjacent part of the housing of the equipment to which the first stabplate part 4 is attached.

The hydraulic rams could be powered from a hydraulic power source 48a provided in or on the device 30, or from a remotely located power source 48b, for example located at the surface via appropriate lines. Furthermore, a local hydraulic pump could be provided, driven from batteries or the like.

In use, when it is desired to separate the first and second stabplate parts 4, 6, firstly the shaft 22 is manipulated as normal, for example using an ROV, to release the clamping load applied thereby and to rotate the shaft 22 to its released position in which the cruciform end thereof is able to pass through the opening in the connector plate 10.

This operation may also apply a separating load to the stabplate parts 4, 6. If a sufficient load can be applied in this manner, then the stabplate parts 4, 6 may be separated at this point without use of the separation device 30. However, if use of the device 30 is desired or required to separate the stabplate parts 4, 6, for example in the case where an over torque has been applied, accidentally, to the shaft 22 resulting in failure thereof and so preventing the use of the shaft 22 in achieving separation, then the device 30 is manoeuvred into position with the guides 42 located within the recesses 46, and with the hub 34 positioned within the recess of the connector and drive input 24 of the second stabplate part 6. The projections 36 are then moved to their extended, deployed positions. The pistons 64 are also operated to drive the latching arms 60 to their engaged positions. It will be appreciated that in this position the device 30 is firmly secured in position. The hydraulic rams are then actuated to bring the end, engaging, surfaces 52 into engagement with the equipment housing and, subsequently, to apply a load which is transmitted to the connector plates 10, 16 through the equipment housing and through the device 30, in particular the arms 40, support 38, guides 42 and latching arms 60, and support frame 20 of the second stabplate part 6, urging the connector plates 10, 16 apart. The magnitude of the separating load that can be applied in this manner is sufficient to overcome the effect of vacuums being drawn in the various hydraulic and/or chemical lines during separation, and is also able to break any calcareous or coral formations or other marine growth which would otherwise prevent separation.

If necessary, as the connector 32 is able to rotate relative to the support frame 38, a torque loading can be applied to the shaft 22 during separation. Consequently, some adjustment of the angular position of the shaft 22 can be achieved, if desired. The separation device could, if desired, be used as an alternative to the use of the in built separation mechanism, where provided, to assist in separation of the parts 4, 6 after the angle of the shaft 22 has been adjusted to allow release of the parts 4, 6.

In an alternative mode of operation, where the part 6 is provided with a secondary release mechanism to allow angular adjustment of the shaft 22 in the event that the primary release mechanism has failed or become jammed, by securing the separation device 30 in position and operating the secondary release, the shaft 22 can be moved to its released orientation using the input connector 32a to apply a torque to the shaft 22, and once the desired orientation has been achieved, and the latching arms 60 have been moved to their engaged positions, the rams 40 can be actuated to separate the parts 4, 6. In this mode of operation, the secondary release mechanism may be conveniently actuated by the use of the device 30. For example, the secondary release mechanism is conveniently operated by rotation of a lever, and a suitable mechanism could be provided to rotate or move the lever to activate this secondary release mechanism. Although the said mechanism could be incorporated into the device 30, this functionality may be provided by an ROV with which the device 30 is used.

Although in the arrangement described hereinbefore the separation force is applied to the parts 4, 6 by the use of hydraulic rams 40, it will be appreciated that this need not always be the case. For example, electrically operated motors 40a may be used to drive appropriate screw actuators 40b or the like to apply the required load. Again, the power source may be local, or surface located.

Whilst pistons are described as being used in driving the latching arms 60 for movement, it will be appreciated that other means, including electrically powered means, may be used. Alternatively, a mechanical input may operate a mechanical drive device to provide this functionality.

To enhance the ease of use of the device, it may conveniently incorporate buoyancy and may incorporate rigging points to aid with deployment. In the event of a loss of power, the device is conveniently arranged to release itself from the associated stabplate connectors.

It will be appreciated that whilst the description hereinbefore is of one embodiment and a number of variant thereto, the invention is not restricted in this regard and a wide range of modifications and alterations may be made thereto without departing from the scope of the invention.

We claim:

1. A subsea separation device for use in separating first and second stabplate connector plates secured to one another by a securing mechanism including a securing shaft associated with one of the first and second stabplate connector plates, part of which is received, in use, within an opening associated with the other of the first and second stabplate connector plates, release of the securing mechanism being adapted to apply a separating load to the stabplate connector plates to urge them apart, the subsea separation device comprising;
   a plurality of first engagement member adapted to temporarily and releasably engage, in use, when required, one of the first connector plate and a component rigidly secured to the first connector plate at locations radially spaced, outwardly, from the securing shaft;
   a plurality of second engagement member adapted to temporarily and releasably engage, in use, when required, one of the second connector plate and a component rigidly secured to the second connector plate at locations radially spaced, outwardly, from the securing shaft; and
   a drive arrangement operable to urge the first and second engagement members apart and so urge the first and second connector plates apart;
   wherein the subsea separation device is adapted to be releasably secured in position, temporarily, when required.

2. A device according to claim 1, wherein the drive arrangement comprises a hydraulic ram operable to urge apart the engagement members.

3. A device according to claim 1, wherein the drive arrangement comprises an electrically powered motor.

4. A device according to claim 3, wherein the motor is used to drive a screw actuator.

5. A device according to claim 1, wherein the drive arrangement is powered from an internal power source.

6. A device according to claim 1, wherein the drive arrangement is powered from a remotely located power source.

7. A device according to claim 1, wherein the drive arrangement is powered from a surface located power source.

8. A device according to claim 1, further comprising actuator means operable to actuate a secondary release feature of one of the stabplate connectors.

9. A subsea separation device for use in separating first and second stabplate connector plates secured to one another by a securing shaft associated with one of the first and second stabplate connector plates, part of which is received, in use, within an opening associated with the other of the first and second stabplate connector plates, the subsea separation device comprising a first engagement member adapted to engage, in use, one of the first connector plate and a component rigidly secured to the first connector plate, a second engagement member adapted to engage, in use, one of the second connector plate and a component rigidly secured to the second connector plate, and a drive arrangement operable to urge the first and second engagement members apart and so urge the first and second connector plates apart, wherein the subsea separation device is adapted to be releasably secured in position, temporarily, when required, wherein the second engagement member comprises a latching arm moveable between a retracted position and an engaged position.

10. A device according to claim 9, wherein the latching arm is movable hydraulically between its retracted and engaged positions.

11. A device according to claim 9, wherein the latching arm is movable electrically between its retracted and engaged positions.

12. A device according to claim 9, wherein the latching arm is movable by a mechanical drive means arranged to be driven by a mechanical input.

13. A device according to claim 12, wherein the mechanical drive means comprises a lever pushed by part of an ROV.

14. A subsea separation device for use in separating first and second stabplate connector plates secured to one another by a securing shaft associated with one of the first and second stabplate connector plates, part of which is received, in use, within an opening associated with the other of the first and second stabplate connector plates, the subsea separation device comprising a first engagement member adapted to engage, in use, one of the first connector plate and a component rigidly secured to the first connector plate, a second engagement member adapted to engage, in use, one of the second connector plate and a component rigidly secured to the second connector plate, and a drive arrangement operable to urge the first and second engagement members apart and so urge the first and second connector plates apart, wherein the subsea separation device is adapted to be releasably secured in position, temporarily, when required, and further comprising torque multiplier means whereby an applied torque can be multiplied and applied to one of the stabplate connectors.

15. A device according to claim 14, further comprising reaction means whereby the multiplied torque can be reacted through the other of the stabplate connectors.

* * * * *